(12) United States Patent
El-Shoubary et al.

(10) Patent No.: US 6,343,611 B1
(45) Date of Patent: Feb. 5, 2002

(54) REDUCED ENERGY CLEANING APPLIANCE

(75) Inventors: Youssef El-Shoubary, North Brunswick, NJ (US); Bang Mo Kim, Schenectady, NY (US); Dwight William Jacobus; Andrew Joseph Spanyer, both of Louisville, KY (US); Joseph Duane Tobbe, Taylorsville, KY (US); Mark Edward Dausch, Latham, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/170,233

(22) Filed: Oct. 13, 1998

Related U.S. Application Data

(60) Division of application No. 08/819,892, filed on Mar. 18, 1997, now Pat. No. 6,001,190, and a continuation-in-part of application No. 08/573,847, filed on Dec. 18, 1995, now abandoned, and a continuation-in-part of application No. 08/573,848, filed on Dec. 18, 1995, now abandoned, and a continuation-in-part of application No. 08/417,552, filed on Apr. 6, 1995, now abandoned, and a continuation-in-part of application No. 08/417,553, filed on Apr. 6, 1995, now abandoned, and a continuation-in-part of application No. 08/573,848, filed on Dec. 18, 1995, now abandoned.

(51) Int. Cl.$^7$ ................................................ B08B 3/00
(52) U.S. Cl. ........................ 134/109; 134/110; 68/18 R
(58) Field of Search .......................... 134/10, 109, 111, 134/110; 68/18 R; 494/35, 43

(56) References Cited

U.S. PATENT DOCUMENTS

| 2,287,927 A | | 6/1942 | Altorfer ........................ 68/148 |
|---|---|---|---|
| 3,003,347 A | * | 10/1961 | Morris et al. ................ 134/109 |
| 3,003,396 A | | 10/1961 | Jenkins ........................... 88/87 |
| 3,313,311 A | * | 4/1967 | Gilson ......................... 134/109 |
| 3,378,018 A | * | 4/1968 | Lawter ......................... 134/109 |
| 3,447,545 A | * | 6/1969 | Lawter ......................... 134/109 |
| 3,765,430 A | * | 10/1973 | Muller ......................... 134/109 |
| 4,070,204 A | | 1/1978 | Hardy et al. ................ 134/25 A |
| 4,097,307 A | * | 6/1978 | Geiger |
| 4,159,211 A | | 6/1979 | Hoffman et al. ........... 134/57 D |
| 4,346,723 A | | 8/1982 | Geiger ......................... 134/104 |
| 4,347,861 A | * | 9/1982 | Clearman et al. ......... 134/104.4 |
| 4,374,443 A | | 2/1983 | Mosell ............................. 15/3 |
| 4,448,359 A | | 5/1984 | Meyers ..................... 241/46.06 |
| 4,468,333 A | | 8/1984 | Geiger ......................... 210/798 |
| 4,977,912 A | * | 12/1990 | Oota et al. ................... 134/109 |

FOREIGN PATENT DOCUMENTS

| EP | 0222306 | 5/1987 |
|---|---|---|
| EP | 0378058 | 7/1990 |
| GB | 2161699 | 1/1986 |
| GB | 2204482 | 11/1988 |
| GB | 2254542 | 10/1992 |

* cited by examiner

*Primary Examiner*—Frankie L. Stinson
(74) *Attorney, Agent, or Firm*—Patrick K. Patnode; Christian G. Cabou

(57) ABSTRACT

The appliance comprises a container for receiving the soiled articles, a circulation pump for distributing a hot liquid to the container, a drain positioned in the container and connected to the pump for emptying the liquid from the container upon completion of a cycle and a hydroclone connected to the drain and the pump, for removing soil from the liquid such that about ninety percent (90%) of the liquid distributed to the container during one cycle can be utilized during at least one subsequent cycle. Another embodiment includes a dishwasher having a normal operating cycle, the dishwasher comprising a container for accommodating a plurality of articles, a circulation pump for delivering a liquid to the container and for circulating the liquid within the container, a diverter connected to the circulation pump for diverting at least a portion of the circulating liquid to a hydroclone while returning at least about ninety percent (90%) of the liquid diverted to the hydroclone to the circulating liquid, the returned liquid having at most about 0.02% solids contained therein.

14 Claims, 2 Drawing Sheets

REDUCED ENERGY CLEANING APPLIANCE

CROSS-REFERENCE TO RELATED APPLICATIONS

This application is a division of application Ser. No. 08/819,892 now U.S. Pat. No. 6,001,190, filed Mar. 18, 1997, which is hereby incorporated by reference in its entirety.

This invention is a continuation in part of commonly assigned patent applications Ser. No. 08/573,847, filed Dec. 18, 1995, entitled "Methods for Reducing the Amount of Energy and Water Consumed by a Cleaning Appliance, now abandoned," Ser. No. 08/417,553, filed Apr. 6, 1995 entitled "Methods for Reducing the Amount of Energy and Water Consumed by a Cleaning Appliance,now abandoned," Ser. No. 08/417,552, filed Apr. 6, 1995, entitled "System for Reducing the Amount of Energy and Water Consumed by a Cleaning Appliance now abandoned," and Ser. No. 08/573, 848, filed Dec. 18, 1995 entitled "System for Reducing the Amount of Energy and Water Consumed by a Cleaning Appliance now abandoned," each of which is herein incorporated by reference.

BACKGROUND OF THE INVENTION

The present invention relates generally to a machine for cleaning articles, more particularly to a machine having a system for reducing the amount of energy and water consumed during an operation cycle.

Reducing the amount of energy and water consumption in appliances such as dishwashers or clothes washers, is a significant problem, in part because a large amount of energy is needed to heat incoming water. For example, dishwashers use energy from two distinct sources. One source is the water-heating energy (WHE) consumed by the hot water heater that supplies hot water to the dishwasher. The second source is the electrical energy used to run the dishwasher pump and a resistance heating element enclosed in the dishwasher. The resistance heating element boosts the water temperature during wash and dries the dishes after they are clean.

The Department of Energy (DOE) requires manufacturers to measure the mechanical energy consumed by the motor and heating element with a kilowatt-hour meter and the quantity of water used with a flow meter and timer. The total energy consumption per cycle is defined as E=WHE+M, where WHE is the water heating energy used by the hot water heater to supply hot water to the dishwasher and M is the mechanical energy consumed by the motor and heating element, that is measured with the kilowatt-hour meter. Incoming 120° F. hot water is assumed to be provided from a 50° F. cold source with a constant volumetric specific heat (Cv) of Cv=0.00240 kwh/gal- ° F. The "Normal" cycle of a typical dishwasher uses a volume (V) of water for an entire cycle of V=9.1 gallons.

The equation for Water Heating Energy (WHE) is WHE V Cv ($T_2$-$T_1$), where $T_2$ is the temperature of the heated water and $T_1$ is the temperature of the water from the cold source. Therefore, the WHE for one cycle is 9.1 gal×0.0024 kwh/gal- F×70 F=1.5288 kwh of water heating energy. The average mechanical energy consumption per cycle runs about 0.65 kwh. From Equation 1, the average total energy consumption for a "Normal" cycle is 2.1768 kwh. Therefore, reducing the water heating energy by reducing the water consumption has a major impact on the overall energy consumption of the dishwasher.

As stated above, the DOE energy rating for the dishwashers is based primarily on the amount of hot water consumed to complete the washing of one load. Most dishwashers presently require about 9.1 gallons of hot water per load. Each load requires about six (6) fills of fresh hot water, about 1.4 to about 1.9 gallons of hot water per fill. The first two fills are needed for the prewash cycles, followed by a fresh fill for the main wash cycles. The last three fills are needed for the two post rinse and one final rinse cycle. Based on six (6) fills (9.1 gallons of water), the DOE rating is about $59.00.

Prior efforts to recycle hot water from one fill to the next have usually involved the use of a screen (coarse or fine) and the use of a centrifuge to separate the soils. The screens often need to be removed and cleaned to prevent bacteria growth, and are, thus, inefficient and impractical. The centrifuge is efficient, but it has to be rotating at all times to provide efficient separation, which requires energy and the moving parts require more space and more maintenance.

Therefore, it is apparent from above that there exists a need in the art for reducing the energy consumption during wash loads of cleaning machines, such as dishwashers. Such systems and methods should at least partially recycle the water during a fill or reuse at least a portion of the same hot water from one cycle to another, thereby, achieving significant energy saving. For the hot water to be recycled or reused, it has to be separated from particles and any suspended or dissolved solids. It is a purpose of this invention, to fulfill these and other needs in the art in a manner more apparent to the skilled artisan once given the following disclosure.

SUMMARY OF THE INVENTION

In accordance with this invention, a cleaning apparatus includes a hydroclone for at least partially recycling hot water used in a cleaning apparatus. One embodiment of the invention disclosed herein is in the form of a dishwasher.

The appliance comprises a container for receiving the soiled articles, a circulation pump for distributing a hot liquid to the container, a drain positioned in the container and connected to the pump for emptying the liquid from the container upon completion of a cycle and a hydroclone connected to the drain and the pump, for removing soil from the liquid such that about ninety percent (90%) of the liquid distributed to the container during one cycle can be utilized during at least one subsequent cycle.

Another embodiment includes a dishwasher having a normal operating cycle, the dishwasher comprising a container for accommodating a plurality of articles, a circulation pump for delivering a liquid to the container and for circulating the liquid within the container, a diverter connected to the circulation pump for diverting at least a portion of the circulating liquid to a hydroclone while returning at least about ninety percent (90%) of the liquid diverted to the hydroclone to the circulating liquid, the returned liquid having at most about 0.02% solids contained therein.

DETAILED DESCRIPTION OF THE PRESENT INVENTION

The basic function of a dishwasher is to clean food soil from dishware. Such soil includes adhered soil, redeposited soil and smudges. Upon completion of the dishwashing cycle, the dishware should be free of waterspots and film and it should be dry or prepared for natural/air drying of the dishware. The equation for dishwashing requires that soiled dishes be placed in a dishware racking system with a water distribution system and a water chemistry system that combine during the washing program to provide clean, substantially spot free dry dishware. The internal water distribution system of a typical dishwasher requires that water must reach all dishware uniformly including the corners, the interior of glasses, cups, and bowls uniformly. Additionally, water must have enough force to wash away heavy soils and to wash out detergent from dispensers.

The water distribution system typically includes a power tower and lower spray arm when the dishwasher is equipped for two levels of water distribution and an additional upper spray arm when the dishwasher is equipped with three levels of water distribution. The upper spray arm showers down on upper rack items washing the inside of upper items. The lower spray washes lower rack items and silverware. Power towers wash items on the upper rack and reach the corners of the interior of the dishwasher. Sufficient pump pressure must be provided to drive the spray arms to achieve proper water distribution patterns. Normally the spray arm revolves at about 12 to about 38 revolutions per minute.

Good pump pressure must be obtained at all times during the washing operation. Presently, some water is cleaned and recirculated through a food filter system.

A typical food filter system removes particulate soil from the water bath thus reducing redeposited soil and collects removed particulate soil for removal from the dishwasher during pump out. The filter is typically self cleaning and the soil collected on the filter is further collected for automatic removal. The filter reduces the size of soil particulate remaining in the recycled water to under about 0.020 inches. A typical food filter system comprises a pump grater/cutter, a flow filter system, a partial filter system and a soil separator system.

Figure 1:
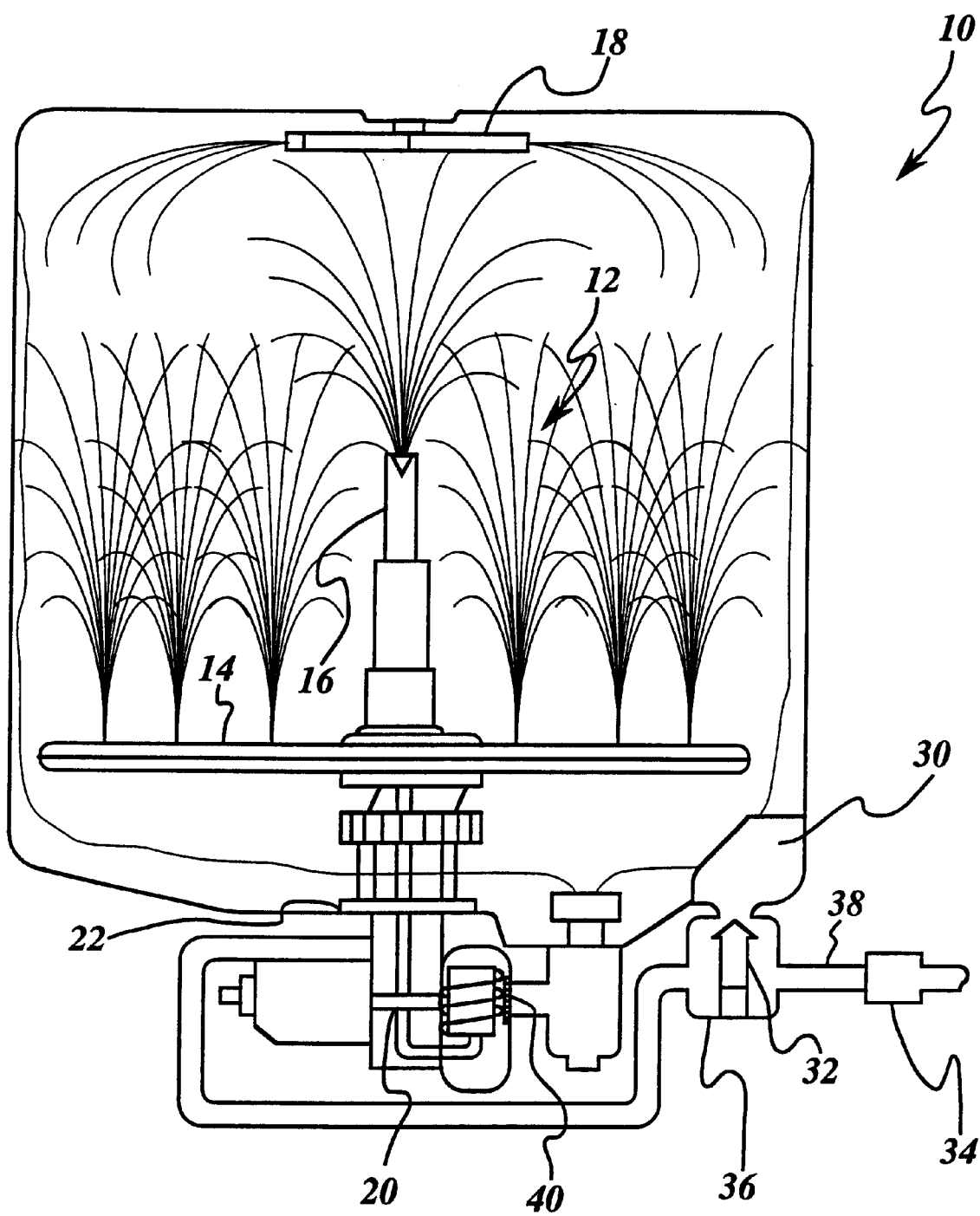
FIG. 1 is a schematic diagram of a dishwasher embodying the present invention.

A conventional dishwasher 10 includes a container for containing articles during a washing, as shown in FIG. 1. Clean water is sent to a water distribution system 12 which includes a multi-orbit wash arm 14, a telescope tower 16, and an upper spray arm 18. The water is distributed and recirculated by a pump 20. In particular, water from a diverter valve 22 is distributed from the pump 20 via a recirculation hose. The use of appliance 10 as a dishwasher is for illustrative purposes only and is not a limitation of the instant invention.

Conventional dishwasher 10 uses a self-clean filtering system which returns filtered water during each operating cycle. A filter system 30 includes a filter check valve 32, which check valve 32 communicates with the interior of the dishwasher and is positioned in a soil collection chamber 36 between a backflow check valve 34 positioned in a drain pipe 38. During the operation of either a rinse or a wash cycle, backflow check valve 34 is closed. Filter check valve 32 is open as water is recirculated by pump 20 within the interior of dishwasher 10. During this water circulation process the filtered water is returned to the circulating water within dishwasher 10 through the self-cleaning filter and soft food is disposed of by a soft food disposer 40 positioned relative to pump 20.

Upon completion of a cycle, water is drained from dishwasher 10 by pump 20. During this cycle, diverter valve 22 is closed and filter check valve 32 in soil collection chamber 36 is closed with backflow check valve 34 being open thereby allowing water to move from the interior of dishwasher 10 through soft food disposer 40 through pump 20 out through soil collection chamber 36 and out into a drain taking away any soil that was collected in soil collection chamber 36.

Figure 2:
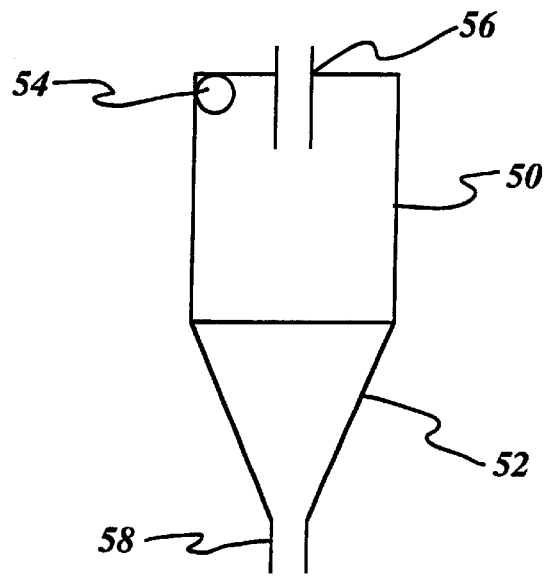
FIG. 2 is a schematic diagram of a hydroclone used in the present invention.

In accordance with the instant invention, at least one hydroclone 42 (FIG. 2) is adapted to replace or supplement filter system 30. Hydroclone 42 is positioned in series or in parallel with filter system 30, so as to remove solid particles from the water and allow at least a portion of the water to be recycled. The basic separation principle employed in hydroclones is centrifugal acceleration, which separates heavier particles from fluid. Unlike a centrifuge (which use the very same principle), hydroclones have no moving parts and the necessary vortex motion is performed by the fluid itself.

Hydroclones are used for removing solids particles from liquids. In so doing, a centrifugal force is generated inside stationary equipment by introducing a high-velocity fluid stream tangentially into a cylindrical-conical chamber, forming a vortex of considerable intensity. Utilizing a hydroclone, separations of solids from liquid can be done by removing up to two to about five mm particles with a pressure drop of about 100 lbs/in.$^2$ ($689 \times 10^3$ N/m$^2$).

As shown, hydroclone 42 consists of a cylindrical section 50 joined to a conical portion 52. The suspension of particles in a liquid is injected tangentially through an inlet opening 54 in the upper part of cylindrical section 50 and, as a result of the tangential entry, a strong swirling motion is developed within hydroclone 42. A portion of the liquid containing a fine fraction of particles is discharged through a vortex 56 disposed in the center-top portion of hydroclone 42 and projecting partially within cylindrical section 50. The remaining liquid containing a coarse fraction of the material leaves through an opening at the apex of the cone, called a spigot 58. Both vortex 56 and spigot 58 diameters will determine the volumetric flow ratios in the under and over flow.

Hydroclones of different sizes have different capacity for water. For example, a one-inch hydroclone can circulate about 1.4 to about 2.4 gallon of water per minute. A two-inch hydroclone can process about four (4) to about sixteen (16) gallon of water per minute while a three-inch hydroclone is capable of processing about 24–50 gallon of water per minute.

Figure 3:
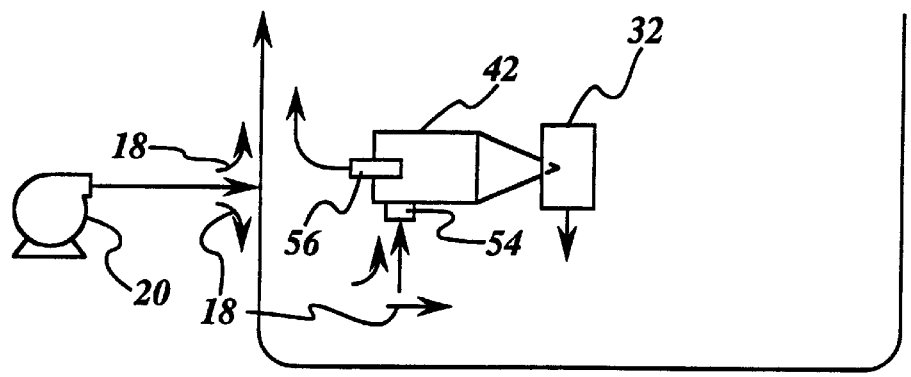
FIG. 3 is a schematic diagram of one embodiment of a dishwasher of the present invention shows the hydroclone of FIG. 2 being utilized to partially recycle the water during a wash cycle.

As illustrated in FIG. 3, filtration system 30, as discussed above, is replaced by hydroclone 42. As illustrated, hydroclone 42 is positioned in a water line so that, during operation, water is continuously cycled through hydroclone 42 removing particulates while the underflow from hydroclone 42 is sent out to solid collection box 36.

At the end of the first prewash as the water exits pump 20, the water is divided into two streams. A first stream delivers water to upper and lower rotating arms 14, 18 and a second stream delivers water into inlet opening 54. The amount of water that goes into inlet opening 54 is dependent upon the diameter of inlet opening and on the capacity of hydroclone 42. As water recirculates, depending upon hydroclone 42 capacity, only a portion of the water can be diverted to hydroclone 42 based upon the pressure that it can accept. For example, a one-inch hydroclone can process only about two gallons a minute at 4–6 psi of water for recirculation through hydroclone 42 back to the main water flow. A two-inch hydroclone provides about six (6) gallons a minute at 4–6 psi for circulation. A three-inch hydroclone can provide approximately twenty-four (24) gallons a minute at 4–6 psi for recirculation. The overflow from hydroclone 42 is then directed back to the dishwasher compartment or to the water line for washer arms 14, 18 and tower 16. The water flow out of pump 20 is about thirty-six (36) gallons per minute at about four (4) to about six (6) psi.

In accordance with another embodiment of the instant invention, a pump pressure of about four (4) to about six (6) psi is utilized. Further, hydroclone 42 comprises a vortex 56 of about 7 mm and a spigot 58 having a diameter of about 3 mm. The average amount of water that goes to vortex 56 and is reusable is about 96% with about 4% being underflow out of spigot 58 into solid collection box 36.

Figure 4:
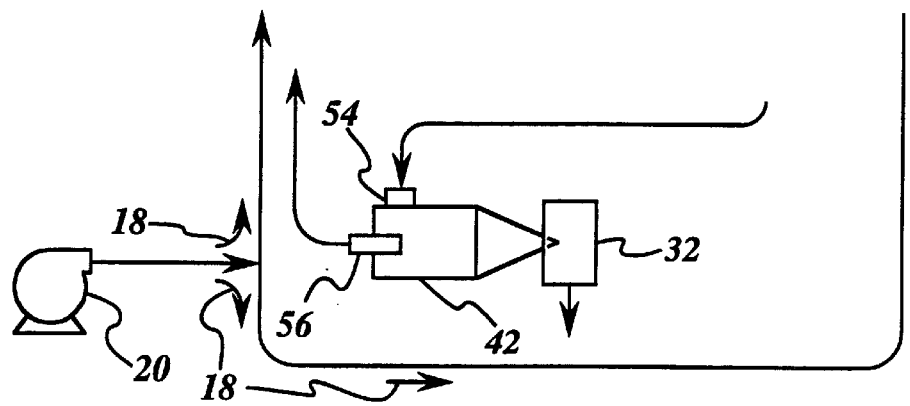
FIG. 4 is a schematic diagram of a second embodiment of a dishwasher of the present invention shows the hydroclone of FIG. 2 being utilized to partially recycle the water during a wash cycle.

As shown in FIG. 4, pump 20 circulates the water through the dishwasher compartment. Hydroclone 42 is connected to the dishwasher compartment so that water collecting at the bottom enters inlet opening 54. The overflow or clean water exits hydroclone 42 via vortex 56 and is returned to the dishwasher compartment for continued circulation by pump 20. In order to circulate the water through hydroclone 42, an additional pump 21 is added for circulating the water through hydroclone 42 by pumping it from the bottom of the dishwasher compartment through hydroclone 42 and back into the dishwasher compartment. As before, underflow exits through spigot 58 and is transferred to soil collection box 36.

Utilizing one or more hydroclones in either the partial or total filtration configuration, during any cycle, depending upon the amount of solids or the amount of water which has been discharged as underflow, only a small portion of a totally clean water fill may be needed.

Specifically, since the hydroclone has proven so effective in removing particulates, as shown in Table 1, it is possible to wash a load a dishes in three fills of fresh water, one fill being utilized for the two prewash fills and the main wash. With an additional fill for the rinse, the two rinse cycles and one for the final rinse.

Additionally, it should be clear that it is also possible to use either four or five fills which would be a savings over the current six fills used in a normal wash cycle, as described above.

Experimental Results

In order to verify the concept, experiments were performed using different combination of spigot/vortex diameters for a one inch hydroclone. The water from the overflow and the underflow was collected and the volumetric split was calculated. Table 1 gives the results. The combination of a seven (7) mm vortex attached to 1.5 mm spigot appears to provide the most effective split. This combination will give underflow of about 4% and an overflow of about 96%. This means that 96% of the water cycled through the hydroclone was returned as usable water.

While the table shows the vortex spigot the pressure on the water or liquid flow is 15, 30, 40 and 50 psi this does not have an impact on the amount of water. The pressure is not determinative and the lower pump pressure of 4 to 6 psi will result in approximately the same split between overflow and underflow.

TABLE 1

Summary of water split results using 1 inch hydroclone

| (mm/mm) | | | | |
|---|---|---|---|---|
| 5.5/3.2 | 82 | 81.5 | 82.5 | 82 |
| 5.5/2.2 | 91.7 | 91.7 | 92 | 92 |
| 5.5/1.5 | 94.7 | 94.7 | 95.1 | 95.3 |
| 7/3.2 | 94 | 90.3 | 93 | 94 |
| 7/2.2 | 95.3 | 94.9 | 95.3 | 95.3 |
| 7/1.5 | 96.6 | 96.6 | 96.1 | 96.1 |
| 3/3.2 | 39.2 | 39.7 | 39.4 | 39 |
| 3/2.2 | 65 | 64.8 | 64.5 | 64 |
| 3/1.5 | 75.8 | 74.9 | 76 | 75.9 |

To examine the efficiency of separation, coffee grinds were used. The feed for the hydroclone contained 0.47% of coffee grinds. The recycled water contained 0.2% of coffee grinds while the 5% waste water contained 3.53% coffee grinds (78% mass balance).

The second run was performed using 0.04% of coffee grinds in the feed. The recycled water contained less than 0.001% of solids and the waste water contained 1% of solids (114% mass balance).

The same results were obtained with rice, dog food, and actual dishwasher dirty water.

Water/Sand Experiments

These experiments were performed to examine the hydroclone separation efficiency. The feed for these runs was clean, commercially available, playground sand particles mixed with clean water at different concentrations. The one-inch hydroclone with a different spigot vortex combination was used to separate the sand. Both streams (overflow and underflow streams) were collected, dried and the collected soil was screen-analyzed. Table 3 summarizes the results for the run performed at about 20 psi using a 7/3.2 spigot/vortex combination. In all experiments performed, the separation efficiency was above about 80% regardless of the experimental conditions. Additionally, the separation efficiency improved as the solid amount in the feed was reduced. These findings identify the hydroclone as a viable candidate for the dishwasher particle separation, because the solid concentration was typically below about 1%.

TABLE 3

Summary of all the sand/water results using a one inch hydrochlone

| Run # | Pres. PSI | % Solid in Feed (wt %) | Vortex/ Spigot (mm) | % solid Overflow | Solid in Underflow (wt %) | Feed Flow rate (gal/min) | Overflow Flow rate (gal/min) | Overflow Solid/ Total Soil (gm/gm) |
|---|---|---|---|---|---|---|---|---|
| 1 | 20 | 35.5 | 5.5/2.2 | 32.40 | 84.70 | 2.42 | 2.4 | 97.7 |
| 2 | 30 | 9.7 | 5.5/3.2 | 1.60 | 23.60 | 2.9 | 2.34 | 16.9 |
| 3 | 40 | 9.5 | 5.5/3.2 | 1.6 | 34.50 | 3.38 | 2.69 | 10.35 |
| 4 | 50 | 11.1 | 5.5/3.2 | 1.8 | 41.20 | 3.4 | 2.72 | 9.6 |

TABLE 3-continued

Summary of all the sand/water results using a one inch hydrochlone

| Run # | Pres. PSI | % Solid in Feed (wt %) | Vortex/ Spigot (mm) | % solid Overflow | Solid in Underflow (wt %) | Feed Flow rate (gal/min) | Overflow Flow rate (gal/min) | Overflow Solid/ Total Soil (gm/gm) |
|---|---|---|---|---|---|---|---|---|
| 5 | 20 | 9.7 | 5.5/3.2 | 2.3 | 42.60 | 2.74 | 2.22 | 12.4 |
| 6 | 20 | 11.7 | 5.5/3.2 | 2 | 41.00 | 2.8 | 2.3 | 11.8 |
| 7 | 40 | 12.2 | 5.5/2.2 | 10.2 | 72.3 | 3.97 | 3.86 | 73 |
| 8 | 40 | 13.9 | 7/3.2 | 3.1 | 55.3 | 4.3 | 3.61 | 14.2 |
| 9 | 40 | 13.2 | 5.5/3.2 | 2.86 | 52.31 | 5.12 | 4 | 11.96 |
| 10 | 40 | 13.2 | 7/3.2 | 11.9 | 73.15 | 6.23 | 6.1 | |
| 11 | 40 | 7.77 | 7/3.2 | 1.75 | 36.3 | 5.36 | 4.7 | 17.8 |
| 12 | 40 | 7.77 | 5.5/3.2 | 1.67 | 27.27 | 3.66 | 3 | 15.36 |
| 13 | 40 | 3.85 | 7/3.2 | 1.1 | 25.5 | 4.5 | 4.03 | 21.65 |
| 14 | 40 | 3.85 | 5.5/3.2 | 1 | 13.69 | 3.5 | 2.8 | 20.15 |
| 15 | 40 | 2.8 | 7/3.2 | 0.66 | 15.7 | 4.61 | 4.2 | 20.23 |
| 16 | 40 | 2.8 | 5/3.2 | 0.67 | 10.42 | 3.76 | 3.03 | 18.7 |
| 17 | 40 | 14.16 | 7/3.2 | 3.23 | 57.7 | 5.3 | 4.52 | 14.5 |
| 18 | 20 | 8.07 | 5.5/3.2 | 1.78 | 26.6 | 2.2 | 2.1 | 16.45 |
| 19 | 30 | 8.07 | 5.5/3.2 | 1.72 | 27.6 | 2.6 | 2.4 | 15.68 |
| 20 | 40 | 8.07 | 5.5/3.2 | 1.8 | 30.8 | 3.53 | 2.9 | 14.7 |
| 21 | 50 | 8.07 | 5.5/3.2 | 1.63 | 30.9 | 3.96 | 3.3 | 13.72 |
| 22 | 20 | 8.07 | 7/3.2 | 1.93 | 34.72 | 3.1 | 2.76 | 19.9 |
| 23 | 30 | 8.07 | 7/3.2 | 1.83 | 37.27 | 3.44 | 3.4 | 18.4 |
| 24 | 40 | 8.07 | 7/3.2 | 1.8 | 36.14 | 4.5 | 4 | 18.4 |
| 25 | 50 | 8.07 | 7/3.2 | 1.71 | 35.45 | 4.96 | 4.46 | 18.32 |

Experimental Work Using a Dishwasher Pump

These experiments were performed using an available dishwasher pump connected to either the one-inch or the 2-inch hydroclone. The feed for these experiments always contained coffee grinds, real food particles, plastic particles, or any combination of the above.

Dishwasher Pump Throughput

A new dishwasher pump was obtained and was run using clean water as a feed. The volume of the collected water from both the lower and the upper washing arms was recorded. Table 4 summarizes these results. The lower arm had a throughput of 24 gal/min and the upper arm had a throughput of 12 gal/min.

TABLE 4

Summary of GE-Dishwasher Pump Throughput

| Upper Arm Throughput (gal/min) | Lower Arm Throughput (gal/min) |
|---|---|
| 11.3 | 23.77 |
| 12.6 | 24.1 |
| 11.84 | 24.1 |
| 12.11 | 23.87 |
| 12.12 | 24.1 |
| Average = 12 gal/min | Average = 24 gal/min |

Hydroclone Throughput

These experiments were performed using the dishwasher pump connected to a hydroclone to demonstrated the rate of water cleanup. A rate of water cleanup of about 2 gal/min using a one-inch hydroclone and about 8 gal/min using the two-inch hydroclone was observed. These rates were obtained at an inlet feed pressure of about 5 psi. This about 5 psi pressure is the maximum produced pump pressure.

Separation Experiments

To examine the hydroclone separation efficiency at the about 5 psi pressure, coffee grinds mixed with water were used. The feed for the hydroclone contained about 0.47% of coffee grinds. The recycled water contained about 0.2% of coffee grinds while the about 5% waste water contained about 3.53% coffee grinds (about 78% mass balance). In another experiment, about 0.04% of coffee grinds were mixed with the feed (about 1.7 gallons of water). The recycled water contained less than about 0.001% of solids, and the waste water contained about 1% of solids (about 114% mass balance).

The same experiment was repeated using rice and the separation was successful. Table 5 summarizes the rice separation results. In both cases the separation efficiency was above about 90%.

TABLE 5

Rice Separation Using One-Inch Hydroclone

| | Flow Rate (gal/min) | Rice Weight % |
|---|---|---|
| Feed | 3.17 | 0.20% |
| Overflow | 2.77 | 0.02% |
| Underflow | 0.4 | 1.20% |

Turbidity Measurements

These experiments demonstrated the effect of separation on the turbidity values. A turbidity meter similar to that used on the GE-smart dishwasher was used. This particular turbidity meter does not measure the absolute actual turbidity value; however, it measures a relative turbidity value with respect to the clean water. Demonstration of turbidity control using these prototype meters was deemed important to simulate performance that could be obtained with a GE dishwasher to control cleaning cycles. Absolute turbidity meters were also not useful because the turbidity was generally beyond the calibrated range of these meters.

Three relative turbidity meters served as a convenient indicator of satisfactory hydroclone performance. The first was installed on the feed line, the second on the underflow line and the third on the hydroclone waste stream (underflow). The feed to the hydroclone was water mixed with food particles (the standard food mix). The standard food mix was comprised of the following food soil ingredients: dinner plates included 1 tsp. each of beef stew, beef gravy, mashed potatoes, spaghetti, cream corn and spinach; salad plates included 1 tsp. each of margarine, red raspberry preserves, Cheeze Whiz and peanut butter and ½ tsp. each of egg yolk and bread crumbs; dessert dishes included ½ tsp. each of oatmeal and Corn Flakes and ¼ tsp. each of stewed tomatoes and chicken noodle soup; 12 oz. glasses included 5×0.5 tsp. (total 2.5 tsp.) of evaporated milk, 2×0.5 tsp. (total 1 tsp.) orange juice, and 3×0.5 tsp. (total 1.5 tsp.) tomato juice; and 8 oz. cups and saucers included 2.5 oz. coffee. The amount of detergent used totaled about 2.5 oz. The food particles concentration was increased and new readings were obtained.

It is clear that the overflow continuously shows improvement over the feed. While the underflow turbidity reading was worse than the feed, this finding is important because the GE smart-dishwasher depends on the water turbidity measurement to determine the number of water fills and the length of each wash cycle. In other words, an improvement in the smart-dishwasher performance, as monitored, can be expected, if a hydroclone is used. It should be mentioned here that both the one-inch and the two-inch hydroclones behaved very similarly and produced almost the same results.

Horizontally Mounted Hydroclone

Vertical clearance considerations may require horizontal rather than vertical orientation in an actual dishwasher, so the hydroclone was mounted horizontally rather than vertically in four experiments to demonstrate that a horizontally mounted hydroclone has the same separation efficiency as a vertically mounted hydroclone.

Table 6 summarizes the results of these experiments. A separation efficiency of about 90% or above was obtained in every run which was exactly the same as the vertical hydroclone runs. Based on these results both a horizontally mounted hydroclone and a vertically mounted hydroclone produced comparable separation efficiencies.

TABLE 6

Summery of Results Obtained Using Horizontally Mounted Hydroclone

| | | Feed | Overflow | Underflow |
|---|---|---|---|---|
| Run #1-1" Hydroclone spigot/ vortex = 7/3.2 | Solid content (wt %) | 0.074% | 0.019% | 0.88% |
| | Flow Rates (gal/min) | 1.92 | 1.80 | 0.12 |
| | Solid wt/Feed Total Solid | 100% | 6% | 94% |
| Run #2-1" Hydroclone spigot/ vortex = 7/3.2 | Solid content (wt %) | 0.076% | 0.008% | 1.2% |
| | Flow Rates (gal/min) | 1.98 | 1.87 | 0.11 |
| | Solid wt/Feed Total Solid | 100% | 10% | 90% |
| Run #3-2" Hydroclone spigot/ vortex = 14/3.2 | Solid content (wt %) | 0.03% | 0.003% | 2.0% |
| | Flow Rates (gal/min) | 8.35 | 8.24 | 0.11 |
| | Solid wt/Feed Total Solid | 100% | 10% | 90% |

TABLE 6-continued

Summery of Results Obtained Using Horizontally Mounted Hydroclone

| | | Feed | Overflow | Underflow |
|---|---|---|---|---|
| Run #4-2" Hydroclone spigot/ vortex = 14/3.2 | Solid content (wt %) | 0.04% | 0.003% | 2.20% |
| | Flow Rates (gal/min) | 8.22 | 8.1 | 0.12 |
| | Solid wt/Feed Total Solid | 100% | 8.40% | 91.60 |

Hydroclones in Series

In an attempt to further improve the separation efficiency, four two-inch hydroclones in series were used. The feed was clean water mixed with plastic particles (density=about 1.05 cc/gm). As can be seen, the separation efficiency dropped from about 45% in the first hydroclone to about 10% in the third hydroclone. These results demonstrates that several hydroclones in series do not significantly improve the overall performance as compared to a single hydroclone therefore the cost of utilizing multiple hydroclones does not appear to be justified.

Closed-End Hydroclone Throughput

Because the continues loss (bleed) of water from the bottom of the hydroclone is an issue (loss of hot water and consequently loss of energy), experiments were performed using a hydroclone with a closed-end. The spigot was closed by connecting it to a collection chamber.

The overflow stream flow rate of the closed-end hydroclone was compared with that of the open-end hydroclone. The comparison data is summarized in Table 7. The closed-end hydroclone produced higher flow rates than the open-end hydroclone, which was expected, since no loss of water from the spigot was permitted. However, it should be noted here that the closed-end hydroclone has an advantage over the open-end hydroclone in that a larger diameter spigot could be installed without any water loss. Additionally, the large diameter spigot provides better solid separation and reduces the probability of plugging of the spigot in the closed end hydroclone.

TABLE 7

Flow Rates of Open-End Hydroclone and of Closed-End Hydroclone

| | Flow Rate (gal/min) | | | |
|---|---|---|---|---|
| | Run #1 | Run #2 | Run #3 | Average |
| Dead End 2" Hydroclone | 9.2 | 8.4 | 8.24 | 8.6 |
| 2" Hydroclone with 5.4 mm spigot | 7.71 | 7.93 | 7.87 | 7.8 |
| Dead End 1" Hydroclone | 2.1 | 2 | 2.1 | 2.1 |
| 1" Hydroclone with 3.2 mm spigot | 1.74 | 1.8 | 1.8 | 1.8 |

Closed-End Hydroclone Separation Efficiency

To examine the separation efficiency of the closed-end hydroclone, a feed of water mixed with food particles (standard food mix) and coffee grinds was used. The feed contained about 0.4% (by weight) particles. The first set of experiments was performed by collecting the underflow stream continuously with respect to time. The collected samples were then dried in an oven at about 85° C., and the weight of the separated solid was recorded as a function of time.

A second set of experiments was performed using a closed-end hydroclone. The collection chamber, at the bottom of the hydroclone, was changed between runs. The solids collected in the collection chamber were dried and weighed. Initially, the closed-end and the open-end hydroclones had the same efficiency; however, with time (as the collection chamber gets full with particulate), the efficiency of the closed-end hydroclone deteriorates. It should be noted that the solid concentration in the feed was high (above normal dishwasher soil). It is likely that at low solid concentration in the feed both configurations will have exactly the same separation efficiency.

Plastic Particles Feed

These experiments were performed using clean water mixed with plastic particles (Density=about 1.05 gm/cc). A two-inch closed-end hydroclone was used for the separation. The collection chamber, installed on the spigot, was changed with respect to time. The separated plastic particles were dried in an oven at about 90° C. for about 24 hours. The dried sample was weighed and screen-analyzed. The amount of separated particles increased with time, indicating that closed-end hydroclone sustains separation efficiency through buildup of collection chamber inventory. In addition, the overflow stream contained only fine particles (particles below about 0.1 mm diameter).

Pressure Effects

Data was obtained using the two-inch closed-end hydroclone. These experiments quantified the pressure effects on the closed-end hydroclone separation efficiency. The feed for these experiments was plastic particles (about 0.7 cc/gm density) mixed with clean water. The amount of plastic particles in the starting feed was kept at about 0.3% for all runs. The collected plastic particles were dried in an oven at about 90° C. for about 24 hours and then weighed and screen-analyzed. The over flow stream in this case contained some coarse particles, which could be due to the low plastic density that might have caused some particles to float.

Level of Noise

Level of noise experiments were performed and the noise level generated by both the one-inch hydroclone and the two-inch hydroclone was measured. The two-inch hydroclone was inaudible to the ear and undetectable by standard sound power measurements. Noise from the one-inch hydroclone could be detected; however, it was far below the Sound Pressure Level (SPL) on a normally operating dishwasher and would not significantly add to the audible noise level.

From the above, it should be apparent that hydroclones were very effective in removing solids from liquid under normal dish washer pump supply pressure of about 5 psi; the efficiency of separation decreased as the particle density decreased and as the pressure decreased; the open-end hydroclone separation efficiency did not depend on orientation, i.e. vertical or horizontal; open-end hydroclone lost water through the spigot (about 5% volumetric split) that might be an issue in the consumption of the dishwasher and closed-end hydroclone continuously separated soils from the dishwasher liquid but the efficiency of separation dropped with time (compared to the open-end hydroclone).

It is therefore apparent that there has been provided in accordance with the present invention, a system and method for adjusting an operating cycle of an appliance that fully satisfy the aims, advantages and objectives set forth herein.

The invention has been described with reference to an illustrative embodiment, however, it will be appreciated that variations and modifications can be effected by a person of ordinary skill in the art without departing from the scope of the invention.

While the systems and apparatus contained herein constitute preferred embodiments of the invention, it is to be understood that the invention is not limited to these precise systems and apparatus, and that changes may be made therein without departing from the scope of the invention which is defined in the appended claims.

What is claimed is:

1. A device for cleansing solid articles comprising:
   a container for receiving the solid articles;
   a circulation pump for distributing a hot liquid to the container;
   drain means, operatively positioned in the container and operatively connected to the pump, for emptying the liquid from the container upon completion of a cycle; and
   at least one hydroclone operatively connected to the drain means and the pump, for removing soil from the liquid such that about ninety percent (90%) of the liquid distributed to the container during one cycle can be utilized during at least one subsequent cycle;
   wherein said hydroclone comprises:
   a cylindrical section;
   a conical section operatively connected to the cylindrical section;
   an overflow means, positioned in the center of the top of the cylindrical section, the overflow means projecting some distance down into the cylindrical section, for returning liquid to the container; and
   an underflow means, operatively positioned in the center of the bottom of the conical section, for transporting liquid to the drain means.

2. The device of claim 1, wherein the least one hydroclone comprises:
   a cylindrical section;
   a conical section operatively connected to the cylindrical position;
   an overflow means, operatively positioned in the center of the top of the cylindrical section, the overflow means projecting some distance down into the cylindrical section, for returning liquid to the container; and
   an underflow means, operatively positioned in the center of the bottom of the conical section, for transporting liquid to the drain means.

3. The device of claim 1 wherein the diameter of the overflow means is sufficient to maintain the coil particle size from about one hundred (100) to about three (300) microns.

4. The device of claim 1 wherein the diameter of a vortex is from about three (3) mm to about twelve (12) mm.

5. The device of claim 4, wherein the diameter of the underflow means is from about one (1) to about twelve (12) mm.

6. A dishwasher having a normal operating cycle, the dishwasher comprising:
   a container for accommodating a plurality of articles;
   a circulation pump for delivering a liquid to the container and for circulating the liquid within the container;
   means, operatively connected to the circulation pump, for diverting at least a portion of the circulating liquid to a continuous cleaning device; and means, operatively connected to the container, for returning at least about ninety percent (90%) of the liquid diverted to the continuous cleaning device to the circulating liquid, the returned liquid having at most about 0.02% solids contained therein wherein the liquid distributed to the container during one cycle can be utilized during at least one subsequent cycle.

7. The dishwasher of claim 6 wherein one fill is utilized for the at least one pre-wash fill cycle and the main wash fill cycle.

8. The dishwasher of claim 7, wherein one fill is utilized for the at least one rinse fill cycle.

9. The dishwasher of claim 8, wherein one fill is utilized for the final rinse fill cycle.

10. The dishwasher of claim 6, wherein about one (1.0) to about three (3.0) gallons of liquid per minute are diverted to the hydroclone.

11. The dishwasher of claim 6, wherein about four (4.0) to about sixteen (16.0) gallons of liquid per minute are diverted to the hydroclone.

12. The dishwasher of claim 6 wherein from about ninety percent (90%) to about ninety four (94%) of the liquid diverted to the hydroclone is returned to the liquid circulating within the container.

13. The dishwasher of claim 6 wherein the hydroclone includes a vortex having a diameter of about seven (7) to about eleven (11) mm and a spigot having a diameter of about three and two tenths (3.2) to about nine (9.0) mm.

14. The dishwasher of claim 6, further comprising:
    means, operatively positioned in the dishwasher, for heating the circulating liquid when the temperature thereof falls below a predetermined temperature.

* * * * *